Jan. 22, 1946.  M. JONES  2,393,474
COURSE TRACING DEVICE
Filed Feb. 9, 1942  4 Sheets-Sheet 1

Inventor
Meredith Jones
By *Reynolds & Beach*
Attorneys

Jan. 22, 1946. M. JONES 2,393,474
COURSE TRACING DEVICE
Filed Feb. 9, 1942 4 Sheets-Sheet 2

Inventor
Meredith Jones
By Reynolds & Beach
Attorneys

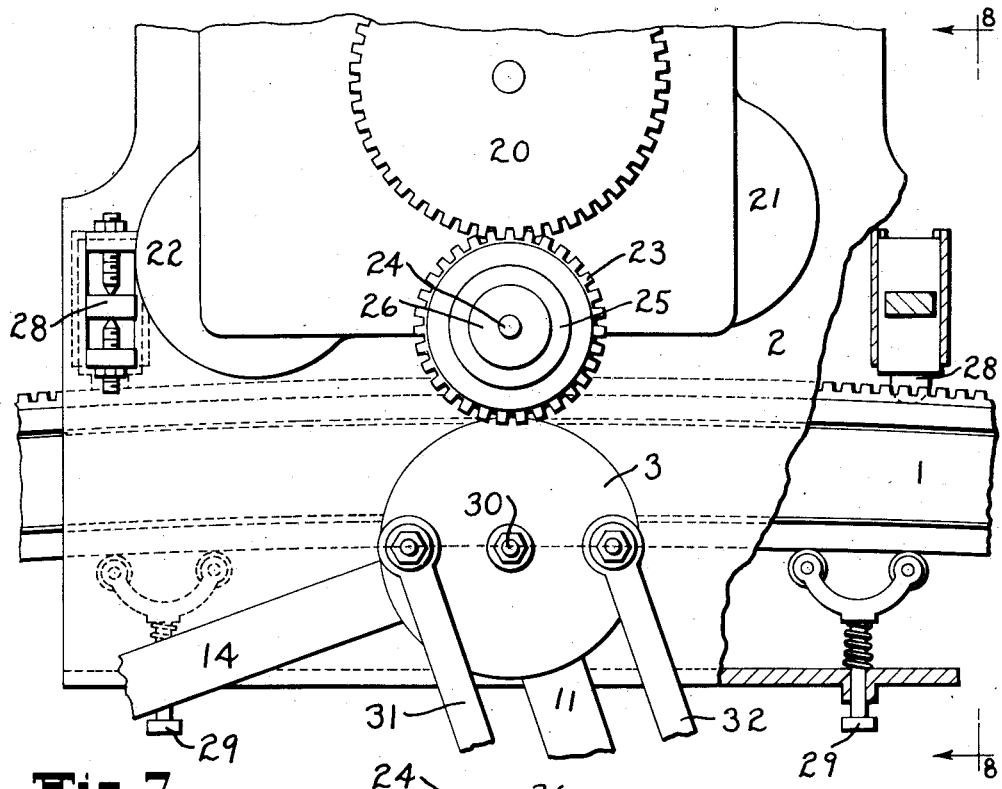
Fig. 7.
Fig. 8.
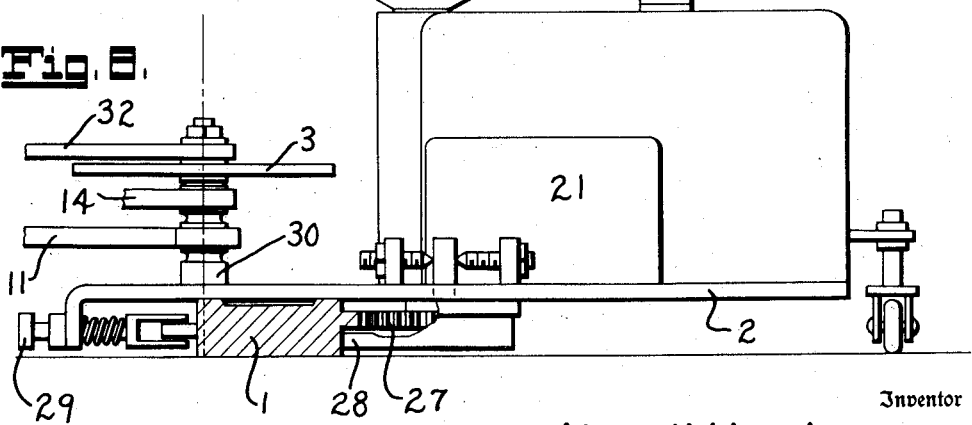
Inventor
Meredith Jones
By Reynolds + Beach
Attorneys

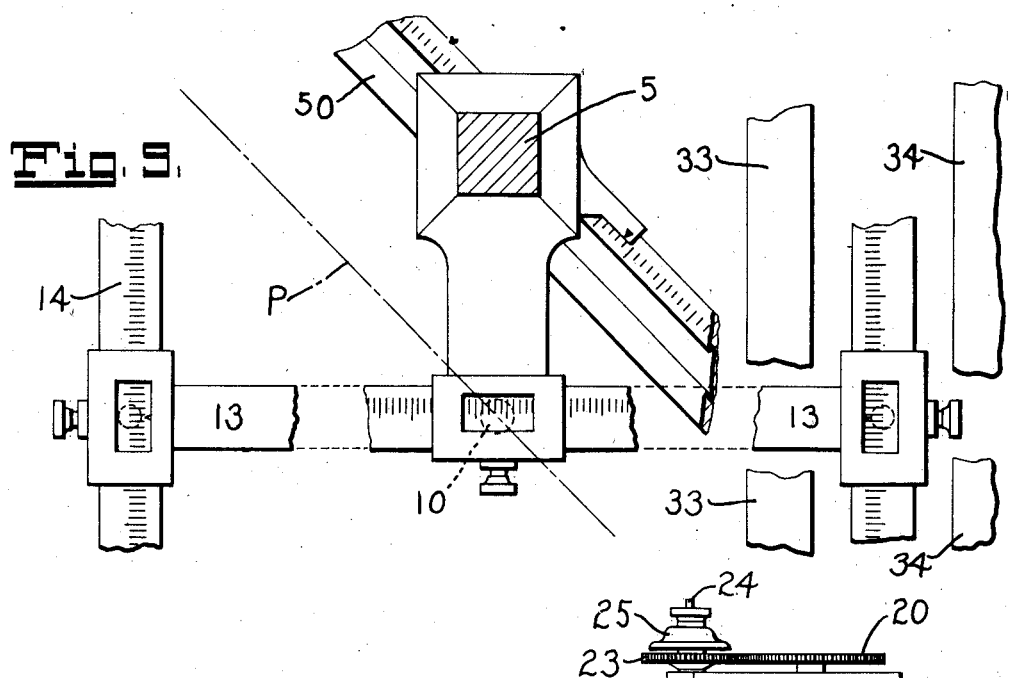
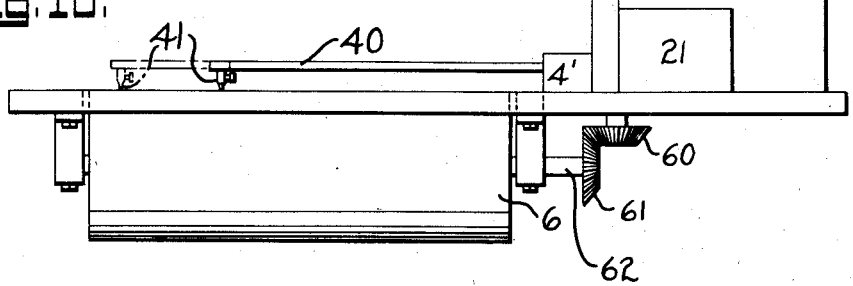
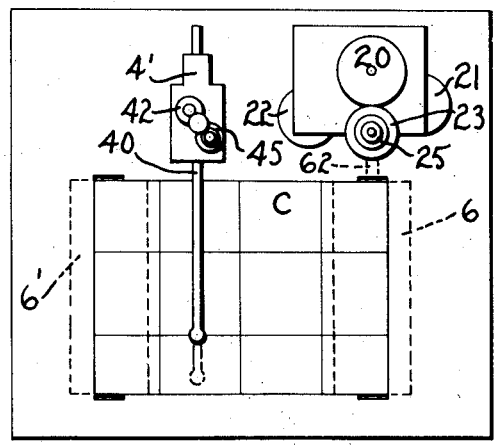

Patented Jan. 22, 1946

2,393,474

UNITED STATES PATENT OFFICE 2,393,474

COURSE TRACING DEVICE

Meredith Jones, Seattle, Wash.

Application February 9, 1942, Serial No. 430,167

16 Claims. (Cl. 234—26)

Mechanism for tracing a course on a chart is herein disclosed which is intended to be operated by latitude and longitude drive mechanism, details of which are disclosed in my Patent No. 2,354,917, issued Aug. 1, 1944, for Position indicating mechanism. Such drives are controlled by gyroscopic devices which may be of the type described in my copending application, Serial No. 430,165, filed Feb. 9, 1942, for a Gyroscopic navigational device.

Gyroscopic instruments have been proposed heretofore which were intended to maintain a definite space orientation, so that their relationship to the earth would change as the latitude or longitude of the location of the gyroscopic device changed. With some of these devices were associated latitude, longitude, or position indicators. None of them, however, as far as I am aware, provided mechanism for automatically tracing a course on a chart without attention by a navigator.

My present invention provides an instrument for thus tracing a course when driven by mechanism responsive to changes in latitude and longitude. In particular, my device is intended for tracing very accurately a course on a chart of large scale, which may be used for marine navigation in inland waters or near the coast line, for example. It may be substituted for the globe recorder, disclosed in my Patent No. 2,354,917 mentioned above, but ordinarily will be used conjointly therewith as a supplemental instrument for reference where precise navigation is required.

It is therefore my present object to trace a course upon a chart having a scale so large that the size of a globe of comparable scale would be prohibitive. Under such circumstances the use of the globe recording mechanism disclosed in my above mentioned patent would be impractical.

It is a further object to provide mechanism for thus tracing a course on a chart representing any portion of the globe surface, whether it be near the equator, near a pole, or any place in between. Adjustment of my mechanism for adaptation to charts of different latitude may be effected very simply.

It is a further object to provide mechanism of different types, though operating upon the same general principle, which are best adapted for use with strip maps rather than for charts of substantially the same latitude and longitude extent.

In providing such a device, it is my purpose to enable adjustment to be made quickly and accurately for charts covering different latitude ranges or scales, and after the proper adjustment has been made to enable the course to be traced upon the chart entirely automatically. Certain features of the mechanism employed in the forms of my mechanism shown in the drawings may, of course, be modified to better adapt it to a particular installation without departing from the principles which govern its operation.

Figure 7 is a plan view of the carriage and longitude drive mechanism showing parts broken away, and Figure 8 is a side elevation view of the carriage taken in the direction of line 8—8 of Figure 7.

Figure 9 is a plan view, with parts in section, of a portion of the pantograph linkage showing the adjusting mechanism.

Figure 10 is a side elevation view, and Figure 11 is a plan view of a modified form of tracing mechanism.

Figure 1:
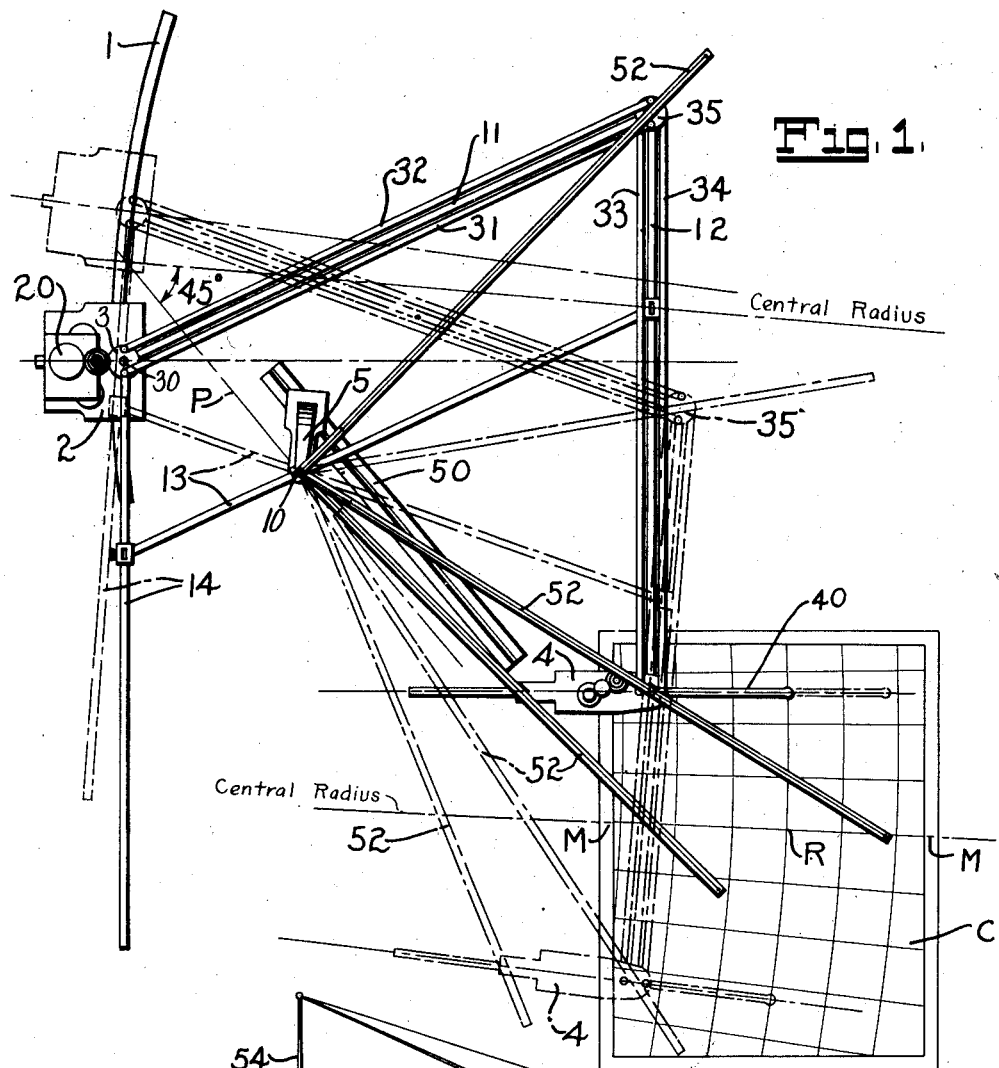
Figure 1 is a plan view of the preferred form of my device.

Because in charts of large scale the meridians may be drawn as straight lines, although the parallels of latitude may be curved, it is preferable that the tracing head move along an arcuate path in accordance with changes in latitude, while longitude changes are recorded by lengthwise reciprocation of an arm carried by the tracing head. The primary consideration, therefore, is the provision of mechanism to accomplish accurate movements of the tracing head parallel to the parallels of latitude, which movement can be regulated for charts of different scale and for parallels of latitude having different curvature.

In designing my tracing devices for a particular type of use, certain factors must be assumed. These will vary according to the installation of the instrument, such as whether it is to be employed in aircraft or in ships, and depends upon the region of longitude to be covered, whether polar, temperate, or equatorial. We must first select, therefore, the average scale of the chart with which the tracing machine will be used and the region where it will find most use. The latter is difficult to determine because a ship may ply anywhere from the torrid zone to either of the polar regions. The scale to be used is more easily selected, for, as pointed out above, my device is particularly useful for navigating where accurate determination of the ship's position is essential. Thus on a flat chart of large scale, in the temperate zones of the northern and southern hemispheres the meridians may be shown as straight lines converging toward the polar region, while the parallels of latitude are curved upward or downward to intersect the convergent meridians perpendicularly in each instance. If the tracing device is to be used only in equatorial regions and on charts of large scale, both the meridians and the parallels of latitude may be straight, parallel lines. In the polar regions the meridians are radii of the latitude circles.

For portions of the earth's surface represented by the chart which are near the north or south pole, the curvature of the parallels of latitude will be of smaller radius, and the meridians will be more convergent to intersect the parallels perpendicularly. If charts drawn to a smaller scale, and hence covering a larger area, are used, the radius of curvature of the parallels will also be shorter. The meridians may be represented substantially accurately by straight lines for charts drawn to a scale as small as one inch equals 100 miles in most instances. For my purposes, however, the charts used will ordinarily be drawn to a much larger scale so that the error in showing the meridians as straight lines is negligible. My tracing element, therefore, may operate with reference to an arc of uniform curvature, that is, a circular arc. Preferably such chart covers approximately one degree of longitude, so that if it is drawn to a scale of one inch equals 3 miles, it will be about 24 inches or two feet square.

Some distortion of the parallels of latitude must occur in transposing them from a globe to a flat chart. In the use of the gnomonic projection the parallels of latitude are curved, while the meridians are substantially straight and converge toward the pole, crossing the curved parallels of latitude perpendicularly, if the charts are not drawn to too large a scale. Thus the error embodied in the use of circular arcs is negligible for charts with a scale under one inch equals 100 miles for temperate and equatorial regions, if the area covered is not too great. With this type of projection, the curvature of the parallels of latitude is less and the degree of convergence of the meridians becomes progressively less toward the equator. Conversely, the radii of the arcs for parallels of latitude nearer the poles are shorter, and the meridians are more convergent. For equal accuracy, therefore, if the meridians are to be shown as straight lines charts of larger scale must be employed near the poles than in the torrid zone.

With my mechanism I prefer to use a specially constructed chart, although it may be adapted to the use of gnomonic projection charts having the characteristics stated that the parallels are represented as arcs of concentric, equally spaced circles and the meridians are straight lines. With my system a carriage 2 is moved along a track 1 of a curvature equal to that of a reference meridian assumed to be located centrally of the zone in which the device will be used principally. For purposes of illustration, we may assume such reference parallel to be the 60th, and we have already assumed a scale of one degree of longitude equals 24 inches or two feet. The radius of curvature of the track will be equal to the length of the meridianal arc from the pole to the reference parallel reduced to the scale of the chart. Thus if the reference parallel is the 60th, the radius of curvature will be the length of 30 meridian degrees multiplied by the length of one meridian degree to scale, which is two feet, making the radius of curvature of the track 60 feet.

Figure 3:
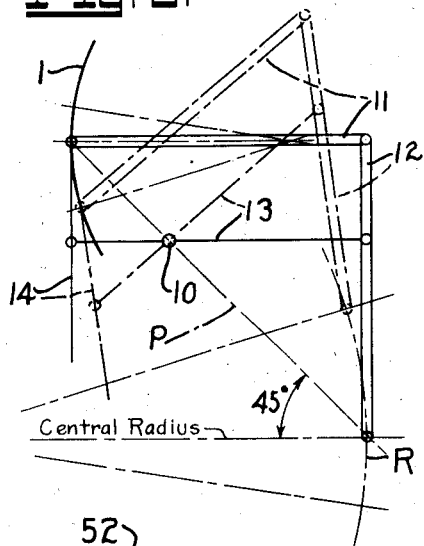
Figures 3 and 4 are diagrams illustrating the operation of the mechanism in Figure 1 in different adjusted positions.
Figure 4:
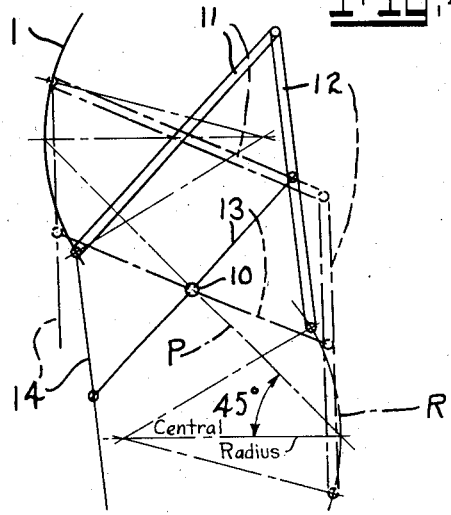

A stylus carried by an arm reciprocating in a tracing head 4, which head is actuated through dog-leg linkage 11, 12 by movement of the carriage 2 along this track 1, may now accurately trace a course on a chart having a range between 59½ and 60½ degrees of latitude. If the device is to be accurate, however, a chart drawn to the same scale but having a central parallel other than the 60th would require a track of different curvature. Despite travel of the tracing head device carriage along a track of fixed arc, charts having latitude parallels of different curvature may be used without requiring such a change in the mechanism. If, in its central location of the chart, the stylus on the scribing arm 40 exactly duplicated at all times the arc of the track along which the carriage moves, a chart of only one latitude range could be used for a given scale. As pointed out above, the degree of latitude parallel curvature varies for different latitudes. I therefore provide a pantograph, to be described in detail hereafter, to cause the tracing head to duplicate the type of movement of the carriage along its arcuate track, although the curvature of the arc described by such head may be different, as shown in Figures 3 and 4. The pantograph structure consists merely of two links 13 and 14 additional to those of the dog-leg linkage 11, 12, one parallel to each link of the latter, to form a parallelogram. The pivot point 10 of the link 13, which is parallel to the carriage supported link 11 of the dog-leg linkage, is fixed, so that the parallelogram linkage may change shape. The ratio of the parts of this link on each side of this fixed pivot will determine the degree of augmentation or diminution between the carriage movement and that transmitted to the tracing head. The structure thus has the characteristics of a pantograph in which the tracing head duplicates the type of movement of the carriage upon the same or a different scale.

To vary the ratio of carriage to tracing head movement and the curvature of the arc over which the head travels, the normally fixed pivot 10 of the pantograph may be moved toward or away from the carriage along a line at an angle of 45 degrees to the central radius of the arcuate track. As such point is moved, the width of the pantograph parallelogram perpendicular to this link will vary with the ratio of the parts into which the pivot divides such link, so that such width is always equal to the length of the link part nearer the carriage. Preferably the setting is accomplished with the carriage at the center of its arc, in which position the pantograph parallelogram will be a rectangle.

Thus the tracing head may move along paths of different curvature, but a constant movement ratio between the carriage and tracing head will be established for each adjusted position of the pivot 10. Although the travel of the latitude arm will be constant, therefore, the longitude movement of the tracing head will be properly regulated according to the diminished length of a degree of longitude near the poles. The length of the latitude degree remains substantially unchanged for charts drawn to the same scale. For the various adjusted positions of the tracing head, therefore, the angular travel of the carriage head will be the same, but the length of the arcs traversed will be different. If charts of different scale are used, however, the reciprocation of the scribing arm must be varied proportionately, as well as the radius of the arc traversed by the head.

If the track 1 is of a curvature corresponding to the 60th parallel of latitude and the central parallel of the chart is 60 degrees, the arc drawn by the mechanism as the ship or other vehicle proceeds east or west will be of the same radius. If the chart has for its center line the 30th parallel, however, instead of the 60th, the radius of the arc to be drawn on the chart must be double that of the track 1, or 120 feet. To scribe such an arc, instead of replacing the track 1 with one of different radius the pivot 10 may be shifted to the position shown in Figure 3, so that the intercept on the pantograph link 13 will be one to two instead of one to one.

While we have assumed the parallels of latitude to be arcs of equally spaced, concentric circles, so that they will intersect the meridians perpendicularly in each instance, such assumption is not quite accurate because on the equatorial side of the central parallel the curvature of the parallels of latitude is actually progressively less than would be indicated by concentric circular arcs, whereas on the polar side of such central parallel the curvature actually should be progressively greater toward the pole than is represented by concentric circular arcs. For a reasonable distance each side of the central parallel for which my device is adjusted, however, the error embodied in the use of circular arcs is negligible for charts drawn to a scale which would be used with it. Similarly, illustration of the meridians as straight lines is not strictly accurate if the longitude covered is too great but the error is negligible for charts of the size which I use.

Theoretically the pantograph could thus be adjusted for all parallels of latitude, but actually play in the parts and the magnification of any slight error in adjustment of the pivot, makes it inadvisable to move the pivot very far from its central position. Thus, for example, if a track 1 having a curvature corresponding to the 60th parallel of latitude is employed, the pantograph should not be adjusted for regions appreciably more than 15 degrees each side of the 60th parallel, which affords a range between the 45th parallel and the 75th parallel. If the charts are all drawn to the same scale, a track 1 having a curvature of shorter radius would be employed for the polar regions beyond 75 degrees, while a track of curvature having double the radius, corresponding to the 30th parallel of latitude, might be employed for the region between 15 degrees and 45 degrees of latitude. For the equatorial region 15 degrees each side of the equator, both the meridians and parallels may be represented as substantially straight, parallel, and equally spaced lines at such large scales, so that the track may be straight.

As described above, the radius of curvature of the track 1 is determined by two factors, namely, the length of the meridianal arc to the reference parallel of latitude, and the scale to which the chart is drawn. Thus for the first track having a radius of 60 feet we assumed a reference parallel of 60 degrees and a scale of one degree equals twenty-four inches, or one inch equals approximately three miles. A track of the same curvature, having a radius of 60 feet, would be required if the 30th parallel of latitude is selected instead as the reference parallel, provided that the scale of the chart is half as large, that is, one degree equals twelve inches or one foot, making one inch equal to approximately six miles. Instead of changing the track 1, therefore, in navigating between 15 degrees and 75 degrees of latitude, the same track may be used for charts having a scale of one degree equals two feet for latitudes between 45 and 75 degrees, and with charts having a scale of one degree equals one foot between 15 degrees and 45 degrees of latitude. In the latter instance mechanism providing a two to one reduction in the travel of the scribing arm, plotting latitude, would be employed.

When used with charts of such scales, the pantograph pivot 10 would be located centrally both for 30 degrees and for 60 degrees of latitude, and the maximum enlargement of the chart arc over the track arc would be for a chart of the larger scale having a central parallel of 45 degrees, which would require a two to three adjustment of pivot 10 along pantograph link 13. The maximum diminution in the radius of the chart arc would be at a latitude of 75 degrees, in which instance pivot 10 would be moved outward along link 13 to establish a ratio of two to one. With such an arrangement the movement of carriage 2 along track 1 for a given movement of the tracing head would never be very great or very small, the very maximum being two to one in the last mentioned instance, which would seldom occur because of the infrequency of navigation at 75 degrees of latitude.

Figure 2:
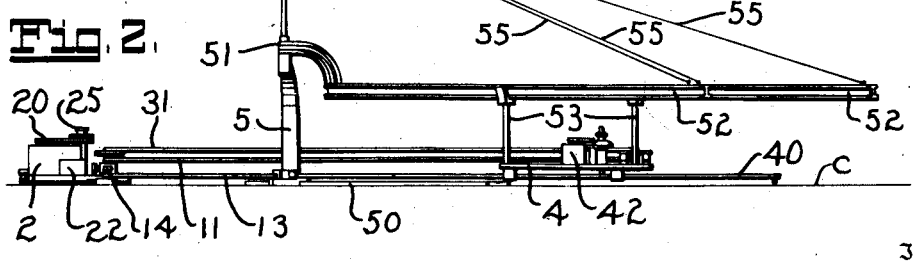
Figure 2 is a side elevation view thereof.

The mechanical structure of my tracing mechanism is shown generally in Figures 1 and 2. The lengths of links 11 and 12 depend upon the length of the track 1 and the size of the chart across which the tracing head 4 must move. The lengths of links 11 and that of pantograph link 13, connected between links 12 and 14 for completing the pantograph, will be equal. Because the pivot 30 between links 11 and 14 travels with carriage 2, link 14 will also be equal to link 13, since its projecting end must be equal to the portion of link 13 between it and pivot 10, and the portion of link 13 between pivot 10 and link 14 must be equal to the distance between link 13 and carriage 2. The chart C is located so that the scribing arm 40, always reciprocable in a direction perpendicular to movement of the head 4 in response to a change in longitude, may move across the chart. When the carriage 2 is located at the center of the track 1 the scribing arm should be aligned with the central meridian of the chart C, and its central latitude parallel R must also be located accurately in order to trace the course correctly. The central meridian may therefore be aligned with suitable index marks M on the chart table, or the chart may be provided with holes to fit over studs on the table, or some other suitable registering system may be used.

The carriage 2 rests upon the upper surface of the track 1, as shown best in Figure 8, to slide along it, and its overhanging portion is carried by a roller which may be adjustable in height to maintain the base of the carriage parallel to the upper surface of the track. The carriage may be moved by longitude driving mechanism mounted upon it as shown in Figures 7 and 8, which may be of the type described in detail in my Patent No. 2,354,917, for Position indicating mechanism. It consists of time-keeping mechanism 21, and repeater mechanism 22 driven by the longitude gyroscopic device, including an oscillation damper if necessary. The movement of such time-keeping mechanism is integrated by suitable differential or epicyclic gearing to rotate the drive gear 20 in accordance with change in longitude of the gyroscopic mechanism. This drive gear, in turn, rotates an intermeshed gear 23 which may be drivingly engaged with a spindle 24 by means of a suitable clutch.

This clutch is similar to the latitude clutch shown in Figure 5, to be described later, and may be disengaged by unscrewing a nut or knob 26, enabling a clutch spring to lift clutch element 25 out of rotative engagement with the upper side of gear 23, which is faced with friction material. The tracing head, time-keeping mechanism 21, and longitude gyroscope repeater mechanism 22 may then be properly synchronized and the clutch engaged. Thereafter it should be unnecessary ordinarily to disengage the clutch until another chart is to be used, when the head and scribing arm will be synchronized in new positions with the latitude and longitude drive mechanism to indicate the position on the new chart with corresponding latitude and longitude. Before engaging the clutches the location on the chart at which the stylus is to be placed may be ascertained by reference to longitude and latitude dials such as disclosed in my aforementioned patent for position indicating mechanism.

Rotation of spindle 24 will turn gear 27 in mesh with rack teeth on the side of track 1, thus to shift the carriage 2 in one direction or the other along on the track. Adjustable shoes 28, engaged with the track bar, may be positioned so that the carriage will be oriented correctly relative to the track, and so that the teeth of gear 27 will mesh properly with the rack teeth. On the opposite side of the track, spring pressed backing rollers, reacting from the opposite side of the carriage, may engage the track to hold the shoes 28 in contact with the rack side of the track 1.

The gear 20 will be rotated by the longitude gyroscopic repeater mechanism in response to a change in longitude to traverse the carriage 2 in the appropriate direction along the track 1 so that its angular movement will be equal to the actual change in longitude of the gyroscopic device. Thus the carriage will move through one degree, an arc of fixed length, for one degree change in longitude component, and the tracing head likewise will move through an arc of one degree whatever may be the length of such arc relative to the distance through which the carriage moves, as determined by the setting of the pantograph. Although the carriage always moves through the same distance for one degree of longitude component departure, therefore, the distance traveled by the stylus will be less than the carriage travel for latitudes between the reference latitude and the pole, and the distance traveled by the stylus will be greater than the carriage movement for latitudes between the reference parallel and the equator.

If a chart of different scale is used, such as one-half the originally selected scale, as proposed above, it is necessary to compensate the movement of the scribing arm, responsive to latitude changes, for such different scale by a two to one reduction, as pointed out above. No corresponding adjustment of the longitude responsive, carriage drive mechanism is required, however, for instead, when a chart of such smaller scale is used, the pantograph pivot is merely shifted from the one to two relationship of Figure 3 to the one to one relationship of Figure 4. Although the carriage 2 still moves through an arc of one degree of the same length for charts of either scale, when the larger scale chart is used the stylus will move through twice the distance over an arc having twice the radius of the track arc, while the length and radius of the arc traversed by the stylus when the pivot point 10 is shifted to the location of Figure 4, for the chart of smaller scale, will be equal to that of the track arc traveled by the carriage. Movement of the stylus in response to a change in longitude is thus compensated by the pantograph according to the chart scale, instead of adjusting the carriage drive mechanism.

The plate 3 is non-rotatively secured upon carriage 2 by means of a bolt 30. This bolt also serves as a cantilever support for the link 11 of the dog-leg linkage and for the auxiliary link 14 of the pantograph mechanism. Both of these links pivot about bolt 30. The link 12 of the dog-leg linkage has one end pivoted to the other end of link 11, and the free end of link 12 is pivoted to the tracing head 4, as shown best in Figure 5. Link 13 of the pantograph mechanism is pivotally connected to the links 12 and 14 in the manner shown in Figure 9, the intercepts along link 12 and link 14 always being equal, and further being equal to the distance between pivot 10 and the connection between links 13 and 14. Because links 11 and 13 are equal in length and the intercepts of link 13 on links 12 and 14 are equal, these four elements will always constitute a parallelogram whatever change in the angular relationship of links 11 and 12 may occur.

Since the portion of link 13 between its connection with link 14 and pivot 10 is equal in length to the portion of link 14 between such connection and pivot 30 on carriage 2, these two link parts, with a line joining pivots 10 and 30, always form an isosceles triangle. Also, since the lengths of links 12 and 13 are equal, and since the part of link 12 between its connections with links 11 and 13 is equal to the part of link 13 between pivot 10 and link 14, the part of link 13 between its connection with link 12 and pivot 10 will be equal to that part of link 12 between such connection and the tracing head pivot. Thus the part of link 13 between its connection with link 12 and pivot 10, together with the part of link 12 between such connection and its tracing head pivot, and a line joining pivot 10 and such head pivot, will also form an isosceles triangle at all times.

Furthermore, because links 12 and 14 are always maintained parallel and are interconnected by link 13, the angles of these two isosceles triangles included between the equal sides will always be equal. It therefore follows that for all deformed positions of the pantograph parallelogram the base angles also of the two isosceles triangles will be equal to each other. Since the two parts of link 13 at opposite sides of pivot 10 are aligned, it is evident that carriage pivot 30, fixed pivot 10, and the tracing head pivotal connection with link 12 will always be in alignment for all positions of the carriage and head. Because of the similarity of these triangles at all times the ratio of the bases of the triangles will always be the same as the ratio of the parts of link 13 into which it is divided by pivot 10.

Pantograph movement of the tracing head proportionate to movement of the carriage is thus insured.

In order to arrive at the above result the equality of one part of link 13 to the intercepts on links 12 and 14 was postulated. When the links are in rectangular relationship with carriage 2 at the center of track 1, therefore, as shown in full lines in Figure 3, the pivot 10 must always lie on the line P, making an angle of 45° with the central radius of the chart and of the carriage track, and passing through pivot 30. Thus in altering the adjustment of pivot 10 to change the ratio of its parts, such pivot must be moved along this line P to the proper location. Because of the 45° relationship, the movement of the pivot along this line will be greater than its movement along link 13 by the secant of 45°.

The support for pivot 10 is carried by a post 5 whose base is slidable in ways 50 arranged parallel to the line P along which the pivot 10 may be adjusted. Preferably such ways are provided with a scale graduated in units 1.4 times as large as the units on the scales of links 12, 13 and 14, to preserve the secant ratio, as shown in Figure 9. When an adjustment is to be made, therefore, the clamps may all be loosened, post 5 slid along the ways to the new position desired, and then the readings at links 12, 13 and 14 adjusted correspondingly. Verniers may be provided on these scales to facilitate an accurate disposition of the pivot location. The proper ratio of carriage to tracing head movement may be assured by securing the clamps for the slides in such adjusted positions to establish and maintain precisely parallelogram relationship of the several links.

While for charts of a given scale the lengths of the latitude degrees will be substantially the same whatever the latitude, the lengths of the longitude degrees vary materially, so that while they are approximately equal to the latitude degrees at the equator, they are only one-half the length of the latitude degrees at a latitude of 60°. If the latitude degree is taken as the unit of measurement in establishing the scale, therefore, and the chart is made approximately square, the chart would cover 2 degrees of longitude for 1 degree of latitude at 60°. Farther toward the pole the number of longitude degrees covered for each latitude degree would be greater, at 75° a latitude degree being equal to approximately 4 longitudinal degrees.

Despite this difference in ratio between the latitude and longitude degrees the carriage 2 must move along the track 1 through 1 degree of fixed length for each degree change in longitude. If, as in the case assumed, the curvature of the track was established for the 60° reference parallel, and it is desired to employ my device up to 75° of latitude, the carriage should be able to move along the track over a 4° arc. Assuming 1° of latitude to equal 24 inches on the table, such arc would be approximately 48 inches in length, since at the 75th latitude parallel one latitude degree is equal to approximately 4 longitude degrees as compared to 2 longitude degrees at 60°.

If the type of track employed is made interchangeable, or if charts drawn to different scales are employed for different latitude zones, as suggested above, an allowable translational movement of the carriage twice that of the tracing head should be adequate. Suitable safety mechanism should be provided so that when the carriage reaches the end of the track gear 27 will pass beyond the end of the rack to terminate carriage movement, or overload mechanism should be provided in the clutch mechanism between gear 23 and spindle 24, so that it will slip or be disengaged automatically before the stylus in any projected position of the scribing arm can pass beyond the margin of the chart. The plotting mechanism can readily be synchronized again with relation to a chart on the table C, just as in setting it initially.

It will be seen that if charts in the other hemisphere are to be employed, it is merely necessary to turn the charts upside down so that the curvature of the parallels of latitude will be opposite to track 1 in every case. In addition the direction of movement of the drive mechanism for carriage 2 must be reversed, such as by interposition of an idler gear between gears 20 and 23, or by reversing the time-keeping mechanism and longitude repeater system receiver, in order to move the tracing head in the proper sense. Similarly the direction of scribing arm reciprocation, reflecting latitude changes, must be reversed, such as by placing an idler gear between gear 43 and the receiver gear train, or by reversing of the latitude repeater system receiver.

While various arrangements may be provided for supporting the several parts of the mechanism, this problem is somewhat complicated by making the position of pivot 10 adjustable. Since such pivot remains stationary after adjustment while the remainder of the mechanism moves in accordance with the travel of the carriage, a supporting structure may be associated with such pivot, particularly to carry a large portion of the weight of the tracing head. The post 5, carrying this pivot, extends upward in the manner shown in Figure 2 to provide a pivot 51 immediately above pivot 10. Upon this pivot are mounted booms 52 from which various parts of the mechanism may be supported. Such booms may therefore swing about the pantograph pivot during the course tracing operation with the parts to which they are attached. The tracing head, for example, as shown in Figure 5 may be suspended by hangers 53 connected one at each end of the head, and a similar hanger may be connected to the pivot between links 11 and 12. Other points of the mechanism may be similarly supported, if necessary, because the pivot mounting at 51 and the pivoted connection at the base of each hanger enables the supported part to have universal movement in a horizontal plane over the table. These booms may be supported in a cantilever fashion, but because of their considerable length it is preferred that a mast 54 extend upward from the pivot 51 from which will extend the guy wires 55, one to the end of each boom 52.

The tracing head pivot must not only duplicate the type of movement of carriage 2, but because the head carries the reciprocable latitude arm 40 it must be maintained in proper orientation to carriage 2 as it moves about the arc, so that the latitude arm will always be parallel to the local meridian over which the stylus 41 on the latitude arm is poised. For this purpose parallel orientation links 31 and 32 are pivoted upon the fixed plate 3 in locations on a line parallel to a tangent to track 1, and extend outward from such pivots parallel with link 11. A second set of parallel orientation links 33 and 34 are connected with the other ends of links 31 and 32 by means of a plate 35 carried by the pivot between links 11 and 12. The other end of links 33 and 34 are pivoted to the head 4 so that scribing arm 40 is maintained perpendicular to the line of the carriage pivots for links 31 and 32, or parallel to the track radius, for all swung positions of links 11 and 12, just as in a drafting machine construction. Thus the angle of the tracing head will be altered progressively as the longitude changes to preserve such perpendicular relationship of the scribing arm to the latitude parallels of the chart, despite their curvature.

Figure 5:
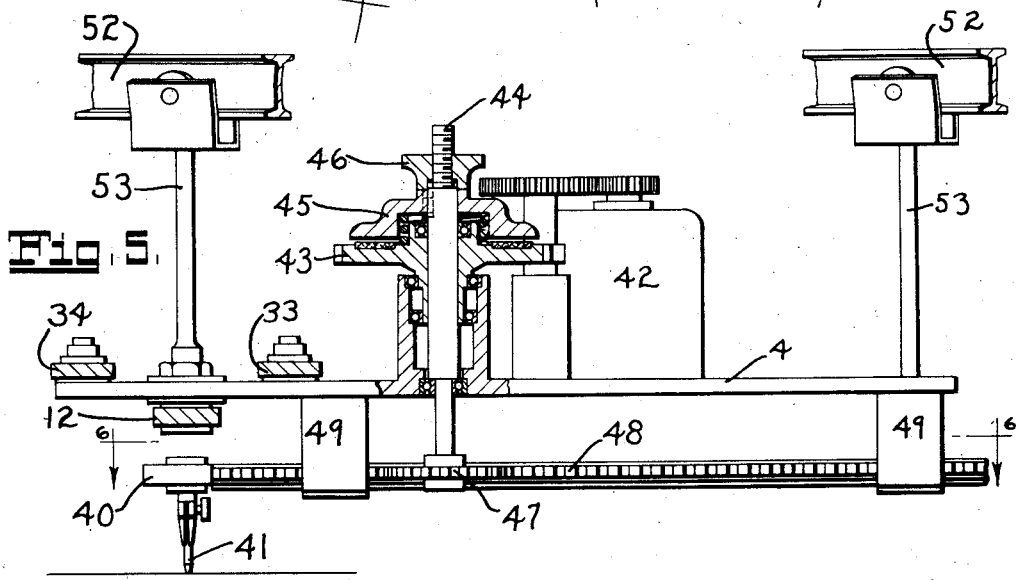
Figure 5 is an enlarged side elevation view of the tracing head showing parts in section.
Figure 6:
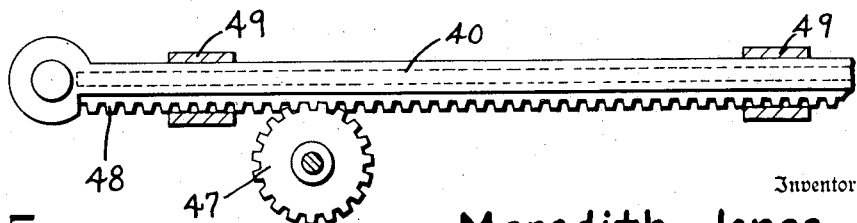
Figure 6 is a section through the tracing head on line 6—6 of Figure 5.

While east and west movement of the stylus 41 is effected by movement of the tracing head, north and south movement, corresponding to changes in latitude, is produced by lengthwise reciprocation of arm 40 which is driven by the latitude drive mechanism 42, shown best in Figure 5. Such latitude drive mechanism will reciprocate the arm lengthwise precisely along a meridian perpendicular to the latitude parallel corresponding to the disposition of such drive mechanism. This drive mechanism may be similar to that described in detail in my patent for Position indicating mechanism mentioned above, which will incorporate an oscillation damper if that should be necessary. By proper reduction gearing the latitude drive mechanism rotates gear 43 which is loose upon spindle 44. This spindle may be rotatively connected with gear 43 by engagement between its friction face and clutch plate 45. The clutch plate 45 will be raised above gear 43 by a spring interposed between them when clutch engaging nut 46 is unscrewed. After proper adjustment of the parts, as described above, the nut may be screwed down to reengage the clutch.

Spindle 44 then rotates pinion 47 meshed with a rack 48 on the side of the scribing arm, to reciprocate the latter in guides 49 by which it is suspended below the tracing head. The gear ratio of the latitude drive mechanism will be such that when the latitude gyroscopic device is displaced through one degree over the earth's surface stylus 41 will be moved north or south through a distance equal to one degree of latitude on a chart of the scale selected. If charts of different scale are to be used, the gear ratio of the latitude drive mechanism will be changed correspondingly, as stated above, such as by replacing the gears between the latitude oscillation damper and gear 43 with gears of different ratio, or by changing the characteristics of the repeater system appropriately.

In preparing charts for use with the course tracing mechanism described above, the same or a duplicate structure may be employed, except that a straight edge would replace the scribing arm 40, and the track 1 would be graduated in degrees, with a suitable index on the carriage which would be freely movable along it. The pantograph mechanism could then be set to correspond to the latitude zone for which the chart is to be prepared, which would maintain the straight edge always in a meridian line. Any fixed point on the straight edge would draw a latitude parallel arc as the carriage is moved along its track.

In the equatorial regions both the latitude parallels and the meridians may be straight, parallel, equally spaced lines, as stated above. For such charts a straight track 1 could be employed with the above mechanism. Instead of a combined pantograph and drafting machine linkage to support the tracing head, an alternative construction may be such head, carrying the scribing arm, mounted in fixed position at the side of the chart table. This device for use with such charts, or with strip maps or other charts having similar characteristics, is shown in Figures 10 and 11. Even in such instances, this type of device should not be used for maps or charts drawn to a small scale, or portraying regions in latitudes far from the equator. In preparing such strip maps to large scale a gnomonic projection would be more accurate for tracing a course principally north and south, whereas, if the course is principally east and west, a Mercator projection might be less subject to error.

With this mechanism, the chart C is carried upon rollers 6 and 6' disposed with their axes parallel, which in turn are parallel to the meridians of the charts. One of these rollers is driven by a gear 20 of longitude drive mechanism such as described above. An operative connection between this mechanism and roller 6 may be effected by a clutch 25 in the same way. Instead of providing a rack and pinion, however, spindle 24 in this instance carries a bevel gear 60 which meshes with a second bevel gear 61 on the roller shaft 62. As the longitude of the gyroscopic device changes, therefore, the chart will be carried under the stylus in an easterly or westerly direction, while the scribing arm will be reciprocated lengthwise by the latitude drive mechanism in a north or south direction, corresponding to a change in latitude of the gyroscopic device. When the clutch 25 is engaged, roller 6 will be rotated so that for every degree change in longitude of the longitude gyroscopic device the chart will be moved in the appropriate direction through 1 degree. The size of roller 6 and the gearing incorporated in the longitude drive mechanism must be such with relation to the scale of chart C as to accomplish this result, and the gear ratio may be varied for charts of different scale.

The latitude arm 40 will be reciprocated by latitude drive mechanism 42, as before, controlled by a clutch 45, except that, in this instance, the tracing head 4' will be stationary instead of moving through an arcuate path. The gear ratio selected for this drive mechanism will, of course, also be dictated by the spacing of the parallels of latitude. Such spacing depends upon both the scale of the chart and the distance from the equator of the region which it represents. As where the previously described mechanism is employed, however, the course traced by the stylus 41 may be the resultant of both a latitude and longitude progression automatically integrated by the mechanism as a whole.

What I claim as my invention is:

1. A course tracing device comprising a tracing head, a chart table adjacent to said head, a scribing arm supported only by one end from said tracing head, means on said head guiding said arm for movement relative to said head only lengthwise of said arm and over said chart table, and drive means operable automatically in response to a shift in position of the device over the surface of the earth thus to move said arm over said chart table corresponding to such shift in position.

2. A course tracing device comprising a tracing head, a scribing arm supported only by one end from said head, means on said head guiding said arm for reciprocation relative to said head only lengthwise of said arm, means supporting a chart beneath said scribing arm, means guiding said tracing head and chart for relative translation only in a direction generally perpendicular to the direction of reciprocation of said scribing arm relative to said tracing head, and drive means operated automatically in response to a latitude and a longitude shift in position of the device over the surface of the earth to effect such relative translation of said tracing head and chart corresponding to one such shift, and to reciprocate said scribing arm relative to said head perpendicular to such tracing head and chart translation corresponding to the other such shift.

3. A course tracing device comprising a track, a carriage guided by said track for movement therealong, a tracing head, pantograph linkage interconnecting said carriage and said tracing head and guiding said head to imitate movement of said carriage along said track, one link of said linkage having a normally fixed pivot intermediate its ends, and means supporting said pivot for adjustment toward or away from said track.

4. A course tracing device comprising a track, a carriage guided by said track for movement therealong, a tracing head, pantograph linkage interconnecting said carriage and said tracing head and guiding said head to imitate movement of said carriage along said track, one link of said linkage having a normally fixed pivot intermediate its ends, means supporting said pivot for adjustment toward or away from said track, and a guide for said pivot supporting means confining movement of said pivot to a locus at an angle of 45 degrees to a line perpendicular to said track at the point of intersection of such locus therewith.

5. A course tracing device comprising a track, a carriage guided by said track for movement therealong, a tracing head, pantograph linkage interconnecting said carriage and said tracing head and guiding said head to imitate movement of said carriage along said track, one link of said linkage having a normally fixed pivot intermediate its ends, a chart table adjacent to said tracing head, a scribing arm carried by said head and movable over said chart table, drive means operated automatically in response to a shift in position of the device over the surface of the earth to move said carriage along said track and said tracing head relative to said chart table simultaneously, corresponding to one component of such shift in position, and drive means carried by said tracing head for reciprocating said scribing arm relative thereto corresponding to the other component of such shift in position.

6. The course tracing device of claim 5, and parallel links alongside pantograph links interconnecting the carriage and the tracing head for maintaining the scribing arm at all times parallel to a line perpendicular to the track at the location of the carriage.

7. A course tracing device comprising a track, a carriage guided by said track for movement therealong, a tracing head, pantograph linkage interconnecting said carriage and said tracing head and guiding said head to imitate movement of said carriage along said track, one link of said linkage having a normally fixed pivot intermediate its ends, means supporting said pivot for adjustment toward or away from said track, a boom pivoted concentrically with but independently of said pantograph linkage pivot, and means supporting said tracing head from said boom.

8. A course tracing device comprising a track, a carriage guided by said track for movement therealong, a tracing head, parallelogram linkage interconnecting said carriage and said head, one link of said linkage having a pivot intermediate its ends and having each end connected to another link of said parallelogram linkage, and means supporting said pivot for adjustment toward or away from said track.

9. A course tracing device comprising a track, a carriage guided by said track for movement therealong, a tracing head, parallelogram linkage interconnecting said carriage and said head, one link of said linkage having a pivot intermediate its ends and having each end connected to another link of said parallelogram linkage, means supporting said pivot for adjustment toward or away from said track, index means cooperating between said intermediately pivoted link and said pivot, and similar index means cooperating between such link and the links with which its ends are connected.

10. A course tracing device comprising a track, a carriage guided by said track for movement therealong, a tracing head, pantograph linkage interconnecting said carriage and said head, one link of said linkage having a normally fixed pivot intermediate its ends and having each end connected to another link of said parallelogram linkage, means supporting said pivot for adjustment toward or away from said track, and a guide for said pivot supporting means confining movement of said normally fixed pivot to a locus at an angle of 45 degrees to a line perpendicular to said track at the point of intersection of said locus therewith.

11. A course tracing device comprising a track, a carriage guided by said track for movement therealong, a tracing head, parallelogram linkage interconnecting said carriage and said head, one link of said linkage having a normally fixed pivot intermediate its ends and having each end connected to another link of said pantograph linkage, means supporting said pivot for adjustment toward or away from said track, index means cooperating between said intermediately pivoted link and said normally fixed pivot, similar index means cooperating between such link and the links with which its ends are connected, a guide for said pivot supporting means confining movement of said normally fixed pivot to a locus at an angle of 45 degrees to a line perpendicular to said track at the point of intersection of said locus therewith, and index means cooperating between said pivot supporting means and said guide, its scale graduations being greater than those of said first index means by the secant of 45 degrees.

12. A course tracing device comprising a tracing head, an actuating member therefor movable both angularly and translationally, pantograph linkage including two links, one of said links being connected directly to said actuating member and the other link being connected directly to said tracing head, and a pivot directly interconnecting said two links, and means operatively connected to said actuating member and to said tracing head, disposed alongside said two links, including a pivot coinciding with said first pivot and operable to preserve corresponding angular orientation of said actuating member and said tracing head.

13. A course tracing device comprising a tracing head, an actuating member therefor movable both angularly and translationally, pantograph linkage interconnecting said actuating member and said tracing head and guiding said head to imitate translational movement of said actuating member, and means including a member carried by a pivot of selected links of said pantograph linkage, which links interconnect said actuating member and said tracing head, and rotatable about the axis of such pivot, and means disposed alongside said selected links, interconnecting said actuating member, said pivot carried member and said tracing head, and operable to transmit rotary movement of said actuating member to said tracing head, to effect orientation of said tracing head corresponding to that of said actuating member.

14. A course tracing device comprising a curved track, a carriage guided by said track for movement therealong, and engageable therewith to control the carriage orientation, a tracing head, pantograph linkage interconnecting said carriage and said tracing head and guiding said head to imitate movement of said carriage along said track, a member carried by a pivot of selected links of said pantograph linkage, which links interconnect said actuating member and said tracing head and rotatable about the axis of such pivot, and parallel links disposed alongside and substantially parallel to said selected links, connected to said carriage, to said pivot connected member, and to said tracing head, and operable to transmit rotary movement of said carriage to said pivot carried member, and to transmit rotation of said pivot carried member to said tracing head for maintaining a predetermined angular relationship between said carriage and said tracing head in all swung positions of said pantograph linkage.

15. A course tracing device comprising a tracing member, an actuating member therefor movable both angularly and translationally, pivoted parallelogram linkage having one pivot connected to one of said members for conjoint movement, and a link opposite said pivot connected to the other of said members for conjoint movement, operable to transmit translational movement of said actuating member to said tracing member, a pair of parallel links disposed alongside said member-connected link and another pair of parallel links disposed alongside a link of said parallelogram linkage interconnecting such member-connected link and said member-connected pivot, one of said pairs of parallel links being connected directly to said actuating member and the other pair of parallel links being connected directly to said tracing member, and a rotative member interconnecting said two pairs of parallel links and rotatable about the axis of the pivot interconnecting the links of said parallelogram linkage alongside said two pairs of parallel links, for preserving corresponding angular orientation of said members, and a fixed pivot connected to the other link of said parallelogram linkage opposite said member-connected pivot, intermediate the ends of such link.

16. A course tracing device comprising a tracing head, an actuating member therefor movable both angularly and translationally, pantograph linkage including two links of equal effective length, one of said links being connected directly to said actuating member and the other link being connected directly to said tracing head, and a pivot directly interconnecting said two links, two orientation links of equal length and of the same length as that of said pantograph linkage links and disposed, respectively, alongside said two pantograph links, one of said orientation links being connected directly to said actuating member and the other of said orientation links being connected directly to said tracing head, and a rotative member interconnecting said two orientation links and rotatable about the axis of said pivot directly interconnecting said two pantograph links, for preserving corresponding angular orientation of said actuating member and said tracing head.

MEREDITH JONES.